United States Patent
Putman et al.

(10) Patent No.: US 11,748,846 B2
(45) Date of Patent: Sep. 5, 2023

(54) SYSTEMS, DEVICES, AND METHODS FOR PROVIDING FEEDBACK ON AND IMPROVING THE ACCURACY OF SUPER-RESOLUTION IMAGING

(71) Applicant: Nanotronics Imaging, Inc., Cuyahoga Falls, OH (US)

(72) Inventors: Matthew C. Putman, Brooklyn, NY (US); John B. Putman, Celebration, FL (US); Vadim Pinskiy, Wayne, NJ (US); Joseph Succar, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 79 days.

(21) Appl. No.: 17/222,425

(22) Filed: Apr. 5, 2021

(65) Prior Publication Data
US 2021/0224966 A1    Jul. 22, 2021

Related U.S. Application Data

(63) Continuation of application No. 17/029,703, filed on Sep. 23, 2020, now Pat. No. 10,970,831, which is a
(Continued)

(51) Int. Cl.
*G03H 1/00*    (2006.01)
*G06T 3/40*    (2006.01)
(Continued)

(52) U.S. Cl.
CPC ........ *G06T 3/4038* (2013.01); *G06F 18/2411* (2023.01); *G06F 18/2413* (2023.01);
(Continued)

(58) Field of Classification Search
CPC ....... G06T 5/50; G06T 3/4053; G06T 3/4038; G06K 9/6269; G06K 9/627; G06V 10/993;
(Continued)

(56) References Cited

U.S. PATENT DOCUMENTS

| 7,570,796 B2 | 8/2009 | Zafar et al. |
| 7,676,077 B2 | 3/2010 | Kulkarni et al. |
| (Continued) | | |

FOREIGN PATENT DOCUMENTS

| CN | 102656442 | 9/2012 |
| CN | 107250872 | 10/2017 |
| (Continued) | | |

OTHER PUBLICATIONS

Dong, et al., "Accelerating the super-resolution convolutional neural network", European conference on computer vision, Springer, Cham, Aug. 2016.
(Continued)

*Primary Examiner* — Howard D Brown, Jr.
(74) *Attorney, Agent, or Firm* — DLA PIPER LLP (US)

(57) ABSTRACT

Systems, methods, and computer-readable media for feedback on and improving the accuracy of super-resolution imaging. In some embodiments, a low resolution image of a specimen can be obtained using a low resolution objective of a microscopy inspection system. A super-resolution image of at least a portion of the specimen can be generated from the low resolution image of the specimen using a super-resolution image simulation. Subsequently, an accuracy assessment of the super-resolution image can be identified based on one or more degrees of equivalence between the super-resolution image and one or more actually scanned high resolution images of at least a portion of one or more related specimens identified using a simulated image classifier. Based on the accuracy assessment of the super-resolution image, it can be determined whether to further process the super-resolution image. The super-resolution image can be further processed if it is determined to further process the super-resolution image.

20 Claims, 7 Drawing Sheets

Related U.S. Application Data continuation of application No. 16/576,732, filed on Sep. 19, 2019, now Pat. No. 10,789,695, which is a continuation of application No. 16/233,258, filed on Dec. 27, 2018, now Pat. No. 10,467,740, which is a continuation of application No. 16/027,056, filed on Jul. 3, 2018, now Pat. No. 10,169,852.

(51) Int. Cl.
    *G06T 5/50*        (2006.01)
    *G06V 10/98*       (2022.01)
    *G06V 20/69*       (2022.01)
    *G06F 18/2411*     (2023.01)
    *G06F 18/2413*     (2023.01)
    *G06V 10/764*      (2022.01)

(52) U.S. Cl.
    CPC .............. *G06T 3/4053* (2013.01); *G06T 5/50* (2013.01); *G06V 10/764* (2022.01); *G06V 10/993* (2022.01); *G06V 20/693* (2022.01)

(58) Field of Classification Search
    CPC .. G06V 20/693; G06V 10/764; G02B 21/365; G02B 21/361
    See application file for complete search history.

(56) References Cited

U.S. PATENT DOCUMENTS

| | | | |
|---|---|---|---|
| 10,169,852 B1 | 1/2019 | Putman et al. | |
| 10,467,740 B1 | 11/2019 | Putman et al. | |
| 2008/0002893 A1 | 1/2008 | Vincent et al. | |
| 2009/0257684 A1 | 10/2009 | Liu | |
| 2011/0037894 A1 | 2/2011 | Sbaiz | |
| 2012/0201436 A1 | 8/2012 | Oakley et al. | |
| 2012/0213452 A1 | 8/2012 | Matsuyama et al. | |
| 2012/0223214 A1 | 9/2012 | Lee et al. | |
| 2013/0070060 A1 | 3/2013 | Chatterjee et al. | |
| 2014/0133702 A1* | 5/2014 | Zheng | B01L 3/508 382/103 |
| 2014/0160266 A1 | 6/2014 | Wereley et al. | |
| 2014/0177706 A1 | 6/2014 | Fernandes et al. | |
| 2014/0267890 A1 | 9/2014 | Lelescu et al. | |
| 2015/0029324 A1 | 1/2015 | Tanabe | |
| 2015/0071567 A1 | 3/2015 | Mishima et al. | |
| 2015/0172726 A1 | 6/2015 | Faramarzi et al. | |
| 2016/0063316 A1 | 3/2016 | Lee et al. | |
| 2016/0320602 A1* | 11/2016 | Kazemzadeh | G02B 21/0056 |
| 2016/0334614 A1* | 11/2016 | Ozcan | G02B 21/361 |
| 2017/0020000 A1 | 1/2017 | Yamakami et al. | |
| 2017/0148226 A1 | 5/2017 | Zhang et al. | |
| 2017/0168285 A1* | 6/2017 | Ozcan | G02B 21/0056 |
| 2017/0193400 A1 | 7/2017 | Bhaskar et al. | |
| 2017/0193680 A1 | 7/2017 | Zhang et al. | |
| 2017/0220000 A1* | 8/2017 | Ozcan | H04N 23/698 |
| 2017/0323223 A1 | 11/2017 | Nagata et al. | |
| 2018/0052425 A1* | 2/2018 | Ozcan | G03H 1/0866 |
| 2018/0075581 A1* | 3/2018 | Shi | G06N 3/045 |
| 2018/0288440 A1 | 10/2018 | Chao | |
| 2019/0333199 A1* | 10/2019 | Ozcan | G06T 3/4046 |
| 2020/0192287 A1* | 6/2020 | Chakravarthula | G03H 1/0866 |
| 2020/0250794 A1* | 8/2020 | Zimmer | G06T 3/4069 |
| 2021/0264568 A1 | 8/2021 | Shi et al. | |

FOREIGN PATENT DOCUMENTS

| | | |
|---|---|---|
| JP | 2008-219188 | 9/2008 |
| JP | 2015-52663 | 3/2015 |
| JP | 2015-197818 | 11/2015 |
| TW | 200608310 | 3/2006 |
| TW | 201802726 | 1/2018 |
| WO | 2017196885 | 11/2017 |

OTHER PUBLICATIONS

Bruna, et al., "Super-resolution with deep convolutional sufficient statistics", arXiv preprint arXiv:1511.05666, 2015.

Ledig, et al., "Photo-realistic single image super-resolution using a generative adversarial network", Proceedings of the IEEE conference on computer vision and pattern recognition, 2017.

Shi, et al., "Real-time single image and video super-resolution using an efficient sub-pixel convolutional neural network", Proceedings of the IEEE conference on computer vision and pattern recognition, 2016.

Zhu, et al., "Unpaired image-to-image translation using cycle-consistent adversarial networks", Proceedings of the IEEE international conference on computer vision, 2017.

Shrivastava, et al., "Learning from simulated and unsupervised images through adversarial training", Proceedings of the IEEE conference on computer vision and pattern recognition, 2017.

Pelt, et al., "A mixed-scale dense convolutional neural network for image analysis", Proceedings of the National Academy of Sciences 115.2, 2018, pp. 254-259.

Yang, et al., "Single-image super-resolution: A benchmark", European Conference on Computer Vision, Springer, Cham, 2014.

Sajjadi, Mehdi SM, Bernhard Scholkopf, and Michael Hirsch. "Enhancenet: Single image super-resolution through automated texture synthesis." Proceedings of the IEEE International Conference on Computer Vision. 2017.

Odena, et al., "Deconvolution and checkerboard artifacts", Distill 1.10, 2016.

Mirza, et al. "Conditional generative adversarial nets", arXiv preprint arXiv:1411.1784, 2014.

Isola, et al. "Image-to-image translation with conditional adversarial networks", Proceedings of the IEEE conference on computer vision and pattern recognition, 2017.

International Search Report of PCT/US19/33293, dated Aug. 15, 2019.

Gawande, "Generative adversarial networks for single image super resolution in microscopy images," Degree Project in Information and Communication Technology, 2018, 120 pages.

Nasibov, et al., "Seamless image stitching algorithm using radiometric lens calibration for high resolution optical microscopy," 2009 Fifth International Conference on Soft Computing, Computing with Words and Perceptions in System Analysis, Decision and Control, IEEE, 2009, 4 pages.

\* cited by examiner

SYSTEMS, DEVICES, AND METHODS FOR PROVIDING FEEDBACK ON AND IMPROVING THE ACCURACY OF SUPER-RESOLUTION IMAGING

CROSS-REFERENCE TO RELATED APPLICATION

This application is a continuation of U.S. application Ser. No. 17/029,703, filed Sep. 23, 2020, which is a continuation of Ser. No. 16/576,732, filed Sep. 19, 2019, now U.S. Pat. No. 10,789,695, issued Sep. 29, 2020, which is a continuation of U.S. application Ser. No. 16/233,258, filed Dec. 27, 2018, now U.S. Pat. No. 10,467,740, issued Nov. 5, 2019, which is a continuation of U.S. application Ser. No. 16/027,056, filed Jul. 3, 2018, now U.S. Pat. No. 10,169,852, issued Jan. 1, 2019, which are incorporated by reference in their entireties.

TECHNICAL FIELD

The present disclosure relates to providing feedback on and improving the accuracy of super-resolution imaging.

BACKGROUND

Inspecting materials for uniformity and detection of anomalies is important in disciplines ranging from manufacturing to science to biology. Inspection often employs microscopy inspection systems to examine and measure specimens. Specimens as used herein refer to an object of examination (e.g., wafer, substrate, etc.) and artifact refers to a specimen, portion of a specimen, features, abnormalities and/or defects in the specimen. For example, artifacts can be electron-based or electronic devices such as transistors, resistors, capacitors, integrated circuits, microchips, etc., biological abnormalities, such as cancer cells, or defects in a bulk material such as cracks, scratches, chips, etc.

Microscopy inspection systems can be used to enhance what a naked eye can see. Specifically, microscopy inspection systems can magnify objects, e.g. features and abnormalities, by increasing the amount of detail that one can see (e.g., optical resolution). Optical resolution, as used herein, refers to the smallest distance between two points on a specimen that can still be distinguished as two separate points that are still perceivable as separate points by a human. Optical resolution can be influenced by the numerical aperture of an objective, among other parameters. Typically, the higher the numerical aperture of an objective, the better the resolution of a specimen which can be obtained with that objective. A single microscopy inspection system can have more than one objective, with each objective having a different resolving power. Higher resolution objectives typically capture more detail than lower resolution objectives. However, higher resolution objectives, e.g. because of their smaller field of view, typically take much longer to scan a specimen than lower resolution objectives.

To obtain higher resolution images, such as those captured according to a higher resolution objective or those created using super-resolution techniques, without sacrificing speed, artificial intelligence models can be used to infer and simulate a super-resolution image from a low-resolution image. Such methods can be achieved without actually scanning the specimen using a higher resolution objective but instead by using all or a portion of a low-resolution image of a specimen, e.g. detected artifacts in a low-resolution image. These methods will be referred to herein interchangeably as super-resolution, super-resolution simulation, super-resolution generation, high-resolution simulation, and the images produced by these methods will be referred to herein interchangeably as super-resolution images and high resolution images that are simulated, e.g. using a high-resolution simulation. Super-resolution images, as used herein, can include images created at resolutions greater than the resolution limits of a microscopy system. Specifically, super-resolution images can include images at resolutions beyond the diffraction limit of a given microscopy system or images created beyond the limits of digital image sensors of a given microscopy system. Super-resolution images, as used herein, can also include images simulated within resolution limits of a given microscopy system, but at a higher resolution than a low resolution image (e.g., a super-resolution image can be an image simulated at the highest resolution at which a microscopy system is capable of imaging).

However, not all artifacts detectable at low resolution are good candidates for generating accurate super-resolution images. For example, an artifact detected using low resolution magnification can correspond to many artifacts detected by high resolution magnification and without additional information, which can be lacking in a low-resolution image of the artifact, it can be impossible to generate an accurate super-resolution image of the low resolution image, e.g. using high resolution simulation.

Accordingly, it is desirable to provide new mechanisms for providing feedback about which artifacts found at low resolution magnification are appropriate or inappropriate for generating super-resolution images. Further, it is desirable to improve the accuracy of generated super-resolution images.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A method can include obtaining a low resolution image of a specimen using a low resolution objective of a microscopy inspection system. A super-resolution image of at least a portion of the specimen can be generated from the low resolution image using a super-resolution simulation. Further, an accuracy assessment of the generated super-resolution image can be identified based on one or more degrees of equivalence between the super-resolution image and one or more actually scanned high resolution images of at least a portion of one or more related specimens identified using a simulated image classifier. The method can also include determining whether to further process the super-resolution image based on the accuracy assessment of the super-resolution image. Subsequently, the super-resolution image can be further processed if it is determined to further process the super-resolution image.

A system can include a microscopy inspection system for inspecting a specimen, one or more processors, and at least one computer-readable storage medium. The microscopy inspection system can include a low resolution objective and a high resolution objective. The computer-readable storage medium can store instructions which when executed by the one or more processors cause the one or more processors to obtain a low resolution image of a specimen using the low resolution objective of the microscopy inspection system. The instructions can further cause the one or more processors to generate a super-resolution image of at least a portion of the specimen from the low resolution image using a super-resolution simulation. Further, the instructions can cause the one or more processors to generate an accuracy assessment of the generated super-resolution image based on one or more degrees of equivalence between the super-resolution image and one or more actually scanned high resolution images of at least a portion of one or more related specimens identified using a simulated image classifier. The one or more processors can also, according to execution of the instructions stored in the computer-readable storage medium, determine whether to further process the super-resolution image based on the accuracy assessment of the super-resolution image. Subsequently, the super-resolution image can be further processed by the one or more processors if it is determined to further process the super-resolution image.

A non-transitory computer-readable storage medium can include instructions which, when executed by one or more processors, cause the one or more processors to perform operations for generating a super-resolution image for a specimen based on a low resolution image of the specimen. Specifically, the instructions can cause the one or more processors to receive the low resolution image of the specimen captured by a low resolution objective of a microscopy inspection system. The instruction can also cause the one or more processors to generate the super-resolution image of at least a portion of the specimen from the low resolution image of the specimen using a super-resolution simulation. Further, the instructions can cause the one or more processors to identify an accuracy assessment of the super-resolution image based on one or more degrees of equivalence between the super-resolution image and one or more actually scanned high resolution images of at least a portion of one or more related specimens identified using a simulated image classifier. The instructions can also cause the one or more processors to determine whether to further process the super-resolution image based on the accuracy of the super-resolution image. Accordingly, the instructions can also cause the one or more processors to further process the super-resolution image if it is determined to further process the super-resolution image.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

In accordance with some embodiments of the disclosed subject matter, mechanisms (which can include systems, methods, devices, apparatuses, etc.) for providing feedback on which artifacts found at low resolution magnification are suitable or unsuitable for generating super-resolution images, which artifacts found in super-resolution images should be rescanned using a higher resolution objective, and improving the accuracy of generated super-resolution images are provided. This type of feedback is useful, for example, to selectively employ super-resolution for suitable portions of a specimen, to identify problematic portions of a specimen, both at low resolution and at high resolution, and to train artificial intelligence models for those problematic areas to generate more accurate super-resolution images.

As disclosed herein, in some embodiments, artificial intelligence can be used to generate super-resolution images from low resolution images, determine artifacts in a low resolution scan of a specimen that are unlikely to generate accurate super-resolution images, determine an image grade for super-resolution images and based on the image grade determine which artifacts need to be scanned using high resolution magnification. The artificial intelligence algorithms can include one or more of the following, alone or in combination: machine learning, hidden Markov models; recurrent neural networks; convolutional neural networks; Bayesian symbolic methods; general adversarial networks; support vector machines; and/or any other suitable artificial intelligence algorithm.

Figure 1:
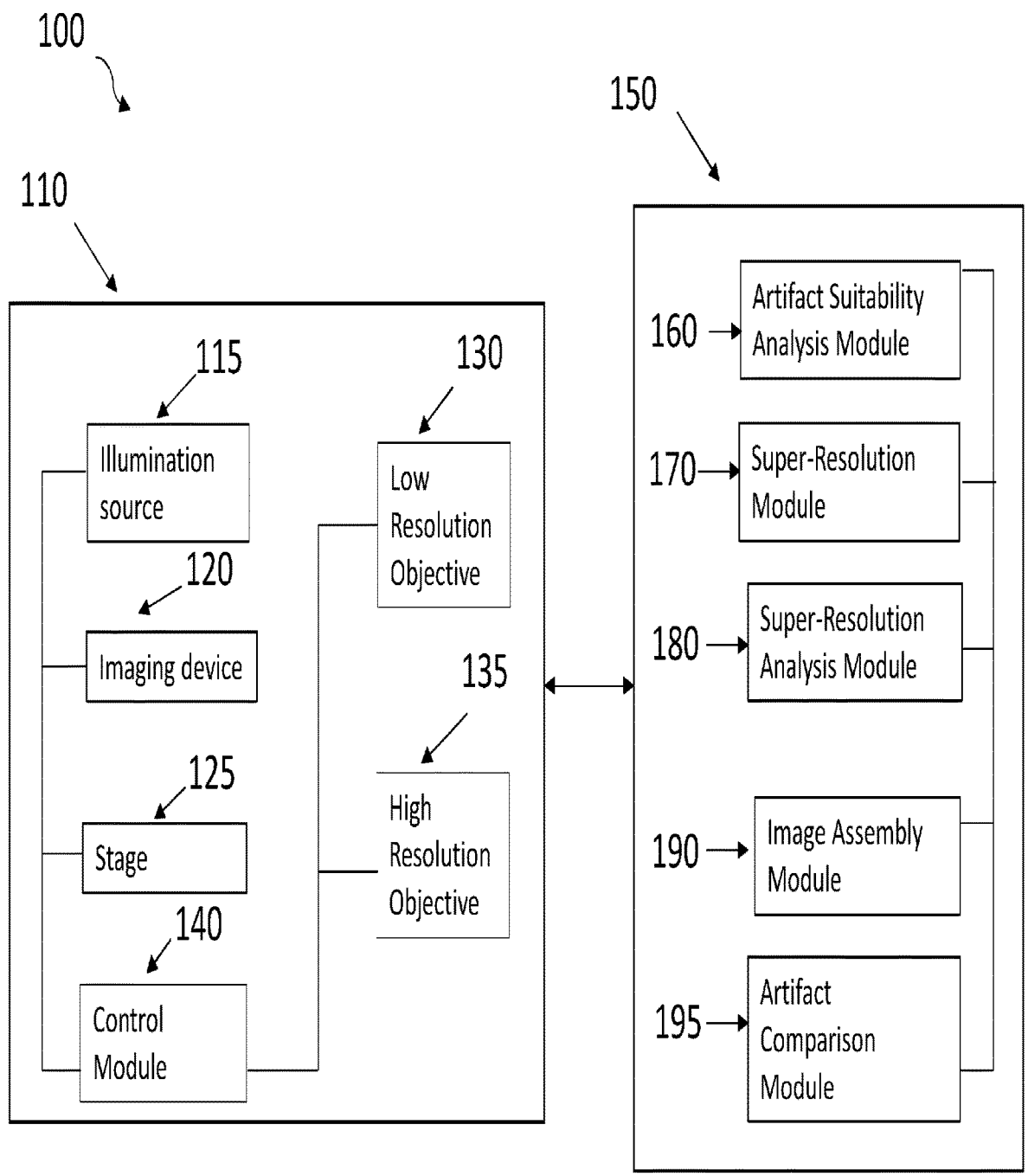
FIG. 1 illustrates an example super-resolution system for generating super-resolution images.

FIG. 1 illustrates an example super-resolution system 100 that can implement super-resolution feedback control to microscopy inspection system 110 and/or computer system 150, according to some embodiments of the disclosed subject matter. Super-resolution feedback control can include: determining after a low resolution scan of a specimen, artifacts that are unlikely to produce accurate super-resolution images and should be scanned at higher resolution; determining an image grade for the super-resolution images and based on the image grade determining which artifacts should be scanned at higher resolution; comparing the total number of artifacts to a tolerance for a similar specimen or to a tolerance defined for super-resolution system 100; and/or using the higher resolution images captured for problematic areas of a specimen to train artificial intelligence models to generate more accurate super-resolution images for those problematic areas.

At a high level, the basic components of super-resolution system 100, according to some embodiments, include a microscopy inspection system 110 and a computer system 150. Microscopy inspection system 110 can include an illumination source 115 to provide light to a specimen, an imaging device 120, a stage 125, a low-resolution objective 130, a high resolution objective 132, 135, control module 140 comprising hardware, software and/or firmware.

Microscopy inspection system 110 can be implemented as part of any suitable type of microscope. For example, in some embodiments, system 110 can be implemented as part of an optical microscope that uses transmitted light or reflected light. More particularly, system 100 can be implemented as part of the nSpec® optical microscope available from Nanotronics Imaging, Inc. of Cuyahoga Falls, Ohio Microscopy inspection system can also be implemented as part of confocal or two-photon excitation microscopy.

Figure 2A:
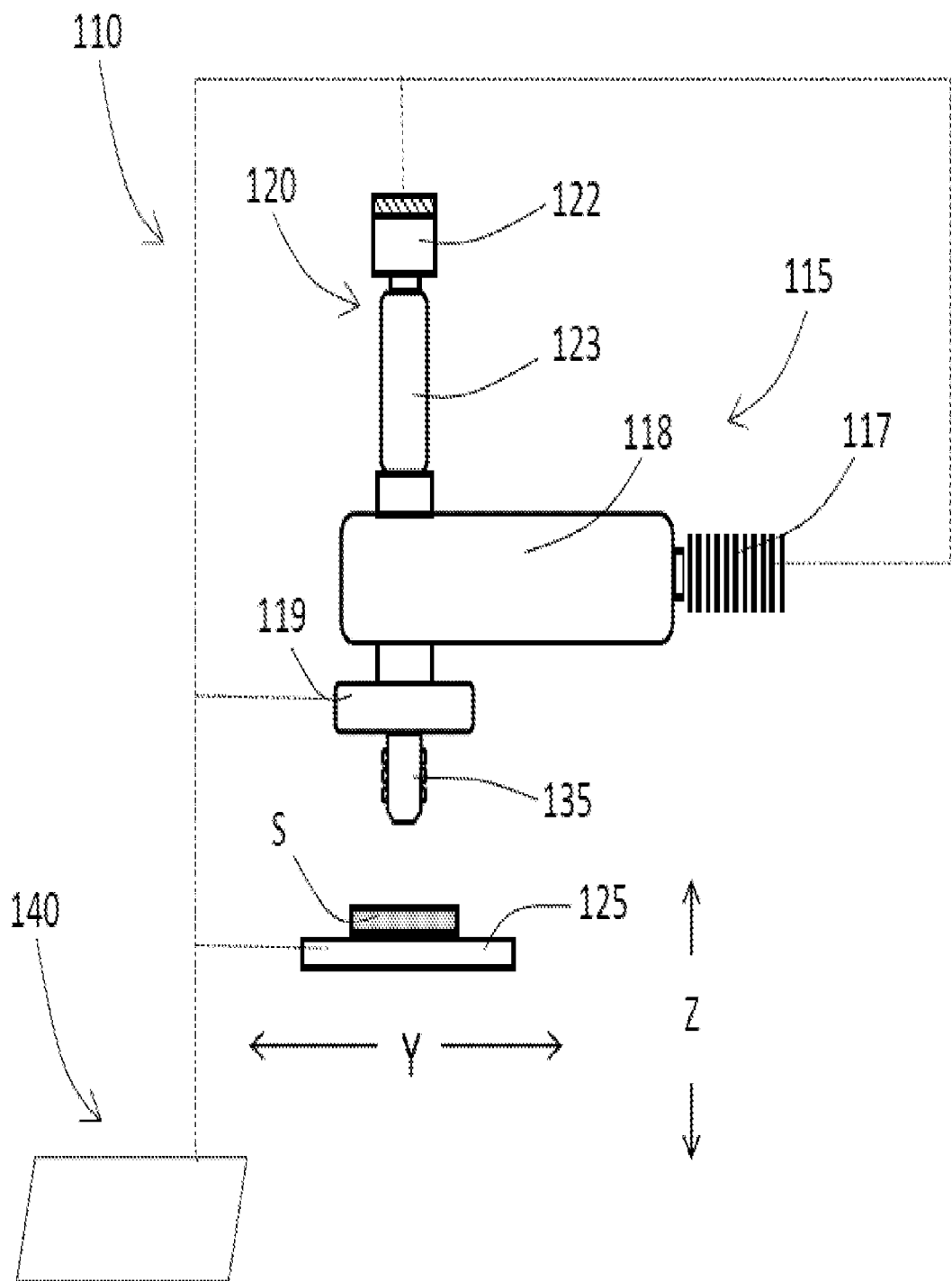
FIG. 2A is a side view of a general configuration of a microscopy inspection system, in accordance with some embodiments of the disclosed subject matter.
Figure 2B:
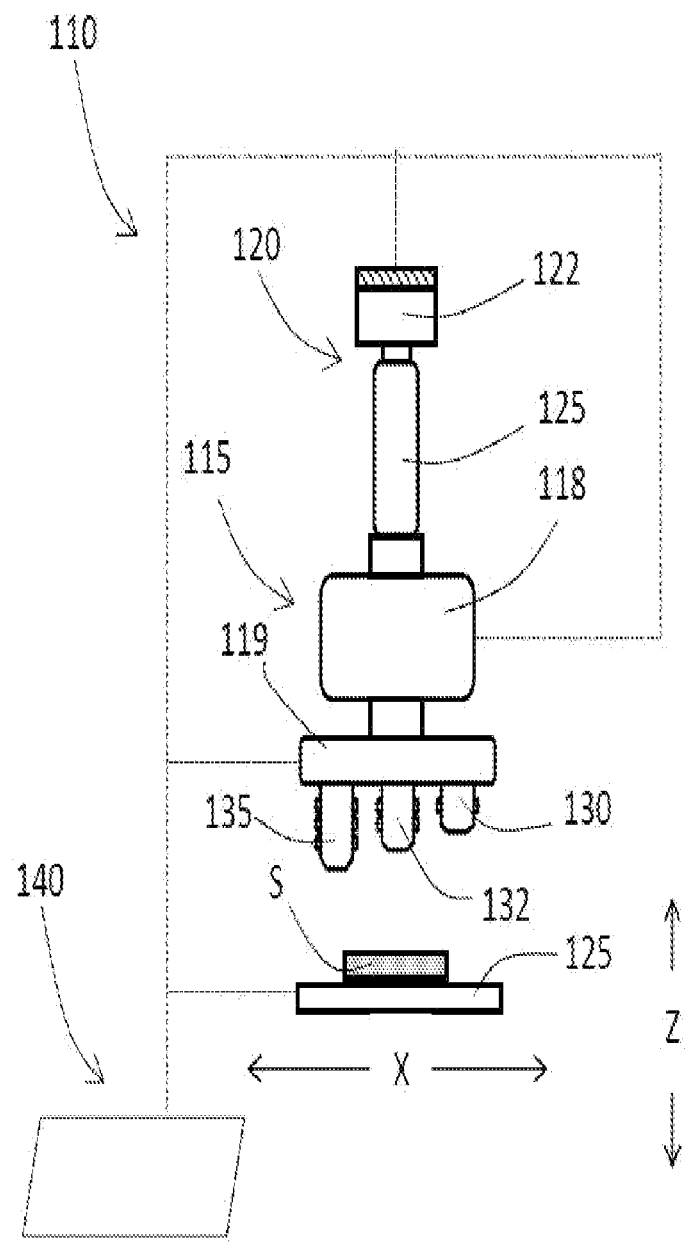
FIG. 2B is a front view of a general configuration of a microscopy inspection system, in accordance with some embodiments of the disclosed subject matter.

FIGS. 2A (side view) and 2B (front view), show the general configuration of an embodiment of microscopy inspection system 110, in accordance with some embodiments of the disclosed subject matter. According to some embodiments, microscopy inspection system 110 can include two or more objectives 130, 132 and 135. Objectives 130, 132 and 135 can have different resolving powers. Objectives 130, 132 and 135 can also have different magnification powers, and/or be configured to operate with brightfield/darkfield microscopy, differential interference contrast (DIC) microscopy and/or any other suitable form of microscopy including fluorescents. In some embodiments, high resolution scanning of a specimen can be performed by using a high resolution microscope like a scanning electron microscope (SEM), a transmission electron microscope (TEM), and/or an atomic force microscope (AFM). In some embodiments, a high resolution microscope can be a microscope that has a magnifying power (e.g., 10x) two times greater than a low resolution microscopy (e.g., 5x). The objective and/or microscopy technique used to inspect a specimen can be controlled by software, hardware, an/or firmware in some embodiments. In some embodiments, high resolution microscopy can be performed in a separate, stand-alone system from low resolution microscopy. In other embodiments, low resolution objective 130 and higher resolution objectives 132 and 135 can reside together in a microscopy inspection unit and be coupled to nosepiece 119.

In some embodiments, an XY translation stage can be used for stage 125. The XY translation stage can be driven by stepper motor, server motor, linear motor, piezo motor, and/or any other suitable mechanism. The XY translation stage can be configured to move a specimen in the X axis and/or Y axis directions under the control of any suitable controller, in some embodiments. An actuator can be used to make coarse focus adjustments of, for example, 0 to 5 mm, 0 to 10 mm, 0 to 30 mm, and/or any other suitable range(s) of distances. An actuator can also be used in some embodiments to provide fine focus of, for example, 0 to 50 µm, 0 to 100 µm, 0 to 200 µm, and/or any other suitable range(s) of distances. In some embodiments, microscopy inspection system 110 can include a focus mechanism that adjusts stage 125 in a Z direction towards and away from objectives 130, 132 and 135 and/or adjusts objectives 130, 132 and 135 towards and away from stage 125.

Illumination source 115 can vary by intensity, number of light sources used, and/or the position and angle of illumination. Light source 117 can transmit light through reflected light illuminator 118 and can be used to illuminate a portion of a specimen, so that light is reflected up through tube lens 123 to imaging device 120 (e.g., camera 122), and imaging device 120 can capture images and/or video of the specimen. In some embodiments, the lights source used can be a white light collimated light-emitting diode (LED), an ultraviolet collimated LED, lasers or fluorescent light.

In some embodiments, imaging device 120 can be a camera that includes an image sensor. The image sensor can be, for example, a CCD, a CMOS image sensor, and/or any other suitable electronic device that converts light into one or more electrical signals. Such electrical signals can be used to form images and/or video of a specimen.

Different topographical imaging techniques can be used (including but not limited to, shape-from-focus algorithms, shape-from-shading algorithms, photometric stereo algorithms, and Fourier ptychography modulation algorithms) with a predefined size, number, and position of illuminating light to generate one or more three-dimensional topography images of a specimen.

In some embodiments, control module 140, comprising a controller and controller interface, can control any settings of super-resolution system 100 (e.g., illumination source 115, objectives 130, 132 and 135, stage 125, imaging device 120), as well as communications, operations (e.g., taking images, turning on and off an illumination source, moving stage 125 and/or objectives 130, 132 and 135). Control module 140 can include any suitable hardware (which can execute software in some embodiments), such as, for example, computers, microprocessors, microcontrollers, application specific integrated circuits (ASICs), field-programmable gate arrays (FGPAs) and digital signal processors (DSPs) (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements. In some embodiments, individual components within super-resolution system 100 can include their own software, firmware, and/or hardware to control the individual components and communicate with other components in super-resolution system 100.

In some embodiments, communication between the control module (e.g., the controller and controller interface) and the components of super-resolution system 100 can use any suitable communication technologies, such as analog technologies (e.g., relay logic), digital technologies (e.g., RS232, ethernet, or wireless), network technologies (e.g., local area network (LAN), a wide area network (WAN), the Internet) Bluetooth technologies, Near-field communication technologies, Secure RF technologies, and/or any other suitable communication technologies.

In some embodiments, operator inputs can be communicated to control module 140 using any suitable input device (e.g., a keyboard, mouse or joystick).

Computer system 150 of super-resolution system 100 can be coupled to microscopy inspection system 110 in any suitable manner using any suitable communication technology, such as analog technologies (e.g., relay logic), digital technologies (e.g., RS232, ethernet, or wireless), network technologies (e.g., local area network (LAN), a wide area network (WAN), the Internet) Bluetooth technologies, Near-field communication technologies, Secure RF technologies, and/or any other suitable communication technologies. Computer system 150, and the modules within computer system 150, can be configured to perform a number of functions described further herein using images output by microscopy inspection system 110 and/or stored by computer readable media.

Computer system 150 can include any suitable hardware (which can execute software in some embodiments), such as, for example, computers, microprocessors, microcontrollers, application specific integrated circuits (ASICs), field-programmable gate arrays (FGPAs), and digital signal processors (DSPs) (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements.

Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

According to some embodiments, computer system 150, can include an artifact suitability analysis module 160, a super-resolution module 170, a super-resolution analysis module 180, an image assembly module 190 and an artifact comparison module 195.

Figure 3:
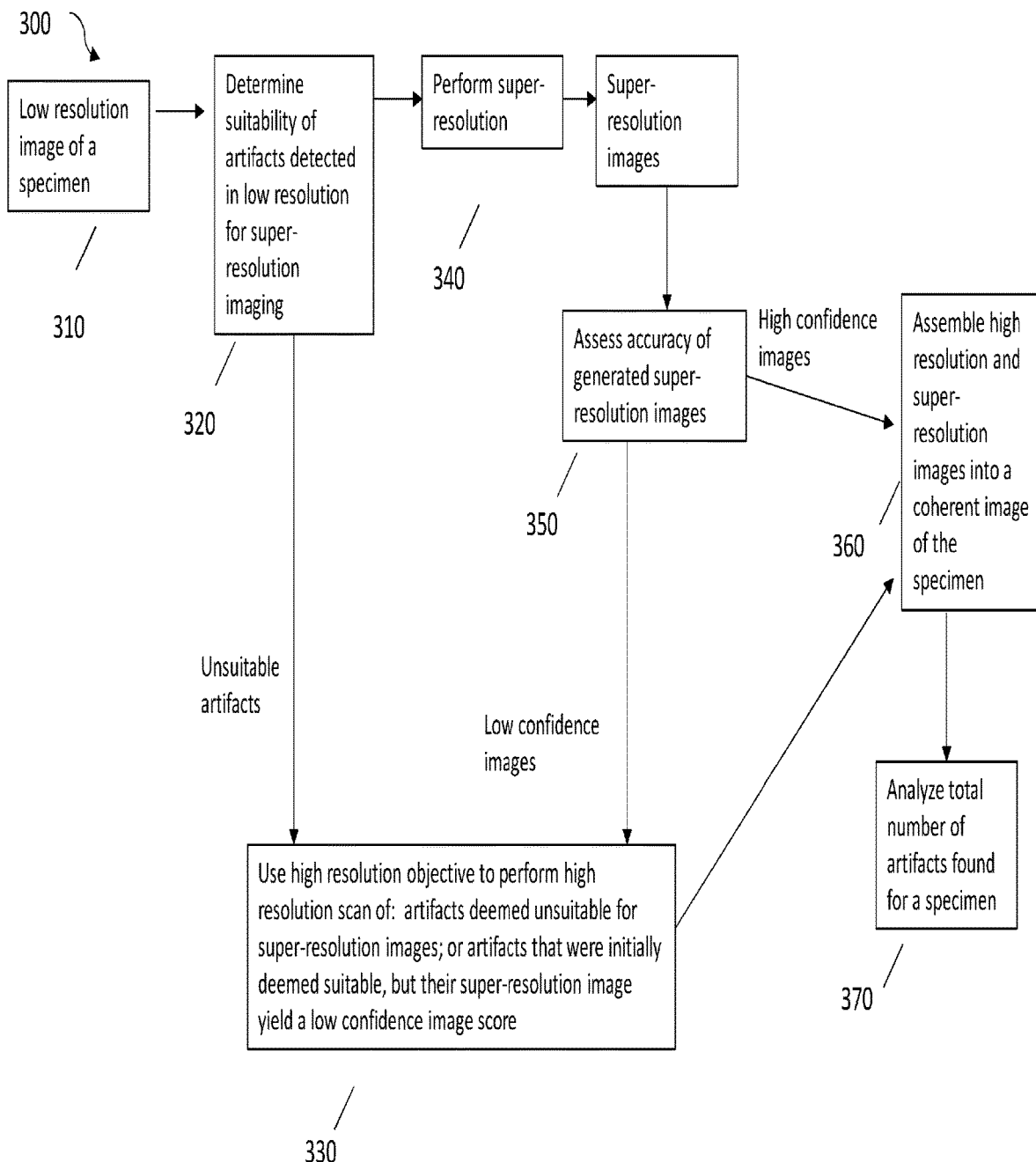
FIG. 3 is a flow of an example operation for using super-resolution image feedback control.

FIG. 3, with further reference to FIGS. 1, 2A, 2B, 4, shows at a high level, an example of a super-resolution operation 300 using super-resolution feedback control, in accordance with some embodiments of the disclosed subject matter. In some embodiments, super-resolution operation 300 can use super-resolution system 100. Further details explaining how each module of computer system 150 can be configured, in accordance with some embodiments of the disclosed subject matter, will be described in connection with FIG. 4.

At 310, microscopy inspection system 110 can scan a specimen using low resolution objective 130. In some embodiments, the specimen can be scanned by moving imaging device 120 and/or stage 125 in an X/Y direction until the entire surface or a desired area of a specimen is scanned. In some embodiments, one or more areas of a specimen can be scanned by using different focus levels and moving stage 125 and/or low-resolution objective 130 in a Z direction. Imaging device 120 can capture and generate low resolution images of the scanned specimen.

At 320, artifact suitability analysis module 160, can use artificial intelligence algorithms and/or other suitable computer programs (as explained further herein) to detect artifacts in the generated low resolution image and determine their suitability for super-resolution imaging. In some embodiments, suitability can be based on cross-correlation of an artifact to known artifacts that have been assessed as suitable or not suitable for super-resolution imaging. Cross-correlation, as referred to herein, can be a measure of similarity of two series (e.g., two images) as a function of the displacement of one relative to the other. More specifically, an image of an artifact being examined and an image of a known artifact, each represents a matrix of intensity values per pixel (0-255), and cross-correlation can specify the value associated with how different or similar the images are at each pixel.

In some embodiments, suitable known artifacts can be artifacts where super-resolution images were generated and those images were determined to be high confidence super-resolution images, e.g. having a high image grade. Conversely, known unsuitable artifacts can be artifacts where super-resolution images were generated and those images were determined to be low confidence super-resolution images, e.g. having a low image grade. High confidence and low confidence super-resolution images and corresponding image grades are further described herein.

While the techniques described herein are made with reference to identifying whether an artifact is suitable for super-resolution simulation, in various embodiments, the techniques can be performed without determining suitability of artifacts for super-resolution simulation.

At 330, a high resolution objective (e.g., high resolution objective 132 or 135) can scan the artifacts determined to be unsuitable by artifact suitability analysis module 160, and imaging device 120 can capture and generate high resolution images of the scanned artifacts. In some embodiments, the generated high resolution images can be provided as feedback to: artifact suitability analysis module 160 to provide additional context data for determining the suitability of an artifact for super-resolution imaging; super-resolution module 170 to improve its accuracy; and/or super-resolution analysis module 180 to provide additional context data for determining the image grade of a super-resolution image. The high resolution images can also be provided to image assembly module 190 for incorporation into a single coherent image, e.g. combining one or more super-resolution images and one or more high resolution images, of a scanned specimen.

At 340, super-resolution module 170, using one or more super-resolution algorithms, can generate super-resolution images for the entire specimen or just the artifacts determined to be suitable for super-resolution by artifact suitability analysis module 160.

Super-resolution analysis module 180, at 350, can receive super-resolution images from super-resolution module 170 and using artificial intelligence algorithm and/or other suitable computer programs (as explained further herein) determine an image confidence of the super-resolution images. As will be discussed in greater detail later an image confidence determination of a super-resolution image can include a specific image confidence determination of the super-resolution image, whether the super-resolution image is a high confidence super-resolution image, whether the super-resolution is a low confidence super-resolution image, and/or an image grade of the super-resolution image. An image confidence determination of a super-resolution image, as determined by the super-resolution analysis module 180, can correspond to a predicted accuracy, e.g. as part of an accuracy assessment, of a super-resolution image created through a super-resolution simulation. A predicted accuracy of a super-resolution image can be an estimate of how accurately a super-resolution image created from a low resolution image actually represents a specimen and artifacts in the specimen. Specifically, a predicted accuracy of a super-resolution image can be an estimate of how accurately a super-resolution image created from a low resolution image actually represents a specimen and artifacts in the specimen as if the super-resolution image was created by actually scanning the artifacts/specimen using a high resolution objective or an applicable mechanism for scanning the specimen at super-resolution. For example, if super-resolution analysis model 180 identifies that a simulated super-resolution image accurately represents 95% of an imaged specimen, then super-resolution analysis module 180 can identify that the super-resolution image is a high confidence super-resolution image.

An image confidence determination of a super-resolution image, as determined by the super-resolution analysis module can correspond to degrees of equivalence between a super-resolution image and one or more actually scanned high resolution images of a specimen. Specifically, super-resolution analysis module 180 can determine how closely a super-resolution image corresponds to an actual high resolution image of the same or similar type of specimen/artifact to determine a confidence in the super-resolution image and a degree of equivalence between the super-resolution image and the high resolution image. This can be based on cross-correlation methods. As used herein, a same or similar type of specimen/artifact is referred to as a related specimen/artifact. For example, a related specimen can include an imaged material that is the same or similar type of material as a currently analyzed specimen. In another example, a related specimen to a current specimen can include the current specimen itself. If a super-resolution image closely correlates to an actual high resolution image of the same or similar type of specimen/artifact, then super-resolution analysis module 180 can indicate that the super-resolution image is a high confidence super-resolution image. Conversely, if a super-resolution image poorly corresponds to an actual high resolution image of the same or similar type of specimen/artifact then super-resolution analysis module 180 can indicate that the super-resolution image is a low confidence super-resolution image and indicate for the underlying artifact to be scanned using a high resolution objective (e.g., 132 and 135) and to generate high resolution images (as in step 330).

At 360, image assembly module 190 can assemble and stitch together (as described further herein), the received super-resolution images and the images scanned using a high resolution objective, into a single coherent image of a scanned specimen.

At 370, artifact comparison module 195 can receive a single coherent image of a specimen and determine a total number of artifacts for the specimen. The artifact comparison module 195 can compare the total number with a tolerance that is typical for the type of specimen that was scanned, or based on a tolerance defined for super-resolution system 100 (e.g., by an operator, hardware/firmware/software constraints, industry guidelines, and/or any other suitable standard).

The division of when the particular portions of operation 300 are performed can vary, and no division or a different division is within the scope of the subject matter disclosed herein. Note that, in some embodiments, blocks of operation 300 can be performed at any suitable times. It should be understood that at least some of the portions of operation 300 described herein can be performed in any order or sequence not limited to the order and sequence shown in and described in connection with FIG. 3, in some embodiments. Also, some portions of process 200 described herein can be performed substantially simultaneously where appropriate or in parallel in some embodiments. Additionally, or alternatively, some portions of process 200 can be omitted in some embodiments. Operation 300 can be implemented in any suitable hardware and/or software. For example, in some embodiments, operation 300 can be implemented in super-resolution system 100.

Figure 4:
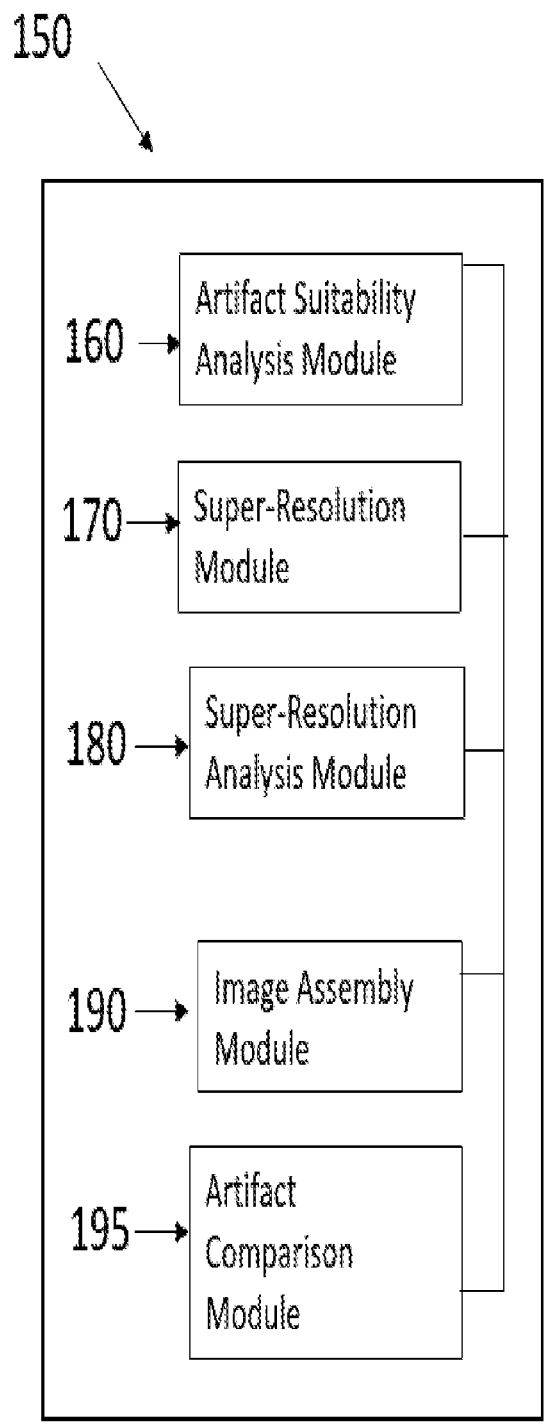
FIG. 4 illustrates an example computer system for controlling super-resolution image generation using super-resolution image feedback control.

FIG. 4 shows the general configuration of an embodiment of computer system 150, in accordance with some embodiments of the disclosed subject matter In some embodiments, artifact suitability analysis module 160 can be configured to receive one or more low resolution images of a specimen from microscopy inspection system 110 and/or any suitable computer readable media. In some embodiments, the low resolution images can be images captured by imaging device 120 using low resolution objective 130. In further embodiments, artifact suitability analysis module 160 can be configured to detect, using computer vision, one or more artifacts in the received image(s) and determine a suitability class for each detected artifact. Detection of an artifact can be based on, e.g., information from a reference design (e.g., a computer aided design (CAD) file, physical layout of a specimen, etc.), deviations from a reference design, and/or data about known artifacts. In some embodiments, one or more artificial intelligence algorithm(s) can be used to determine a suitability class for each identified artifact. In some embodiments, the class can be a binary class (e.g., "suitable" and "not suitable" for super-resolution imaging). In other embodiments, the class can provide greater or higher resolution distinctions of classes (e.g., a letter grade A-F, where A denotes the best grade and where F denotes the worst grade, or a number grade 1-100, where 1 denotes the worst grade and 100 denotes the best grade).

In some embodiments, artifact suitability analyzer module 160 can apply a classification algorithm to determine whether a detected artifact in a low resolution image is or is not suitable for super-resolution generation. In some embodiments, the classification algorithm is first trained with training data to identify shared characteristics of artifacts that are suitable for super-resolution generation and those that are not. In some embodiments, training data can include examples of low resolution images of artifacts along with their assigned suitability classes. In some embodiments, training data can include examples of low resolution images of artifacts along with the image grades assigned to super-resolution images generated for those artifacts. In some embodiments, the classification algorithm can make inferences about suitability based on an artifact's type, size, shape, composition, location on the specimen and/or any other suitable characteristic. In some embodiments, training data can also include explicit suitability assignments based on a portion of a specimen that is being imaged, information from a reference design, an artifact location (i.e., location of an artifact on a specimen), type of artifact and/or its size, shape and/or composition.

Once the classification algorithm is trained it can be applied by artifact suitability analyzer module 160 to determine whether a detected artifact in a low resolution image is suitable or not suitable for super-resolution generation.

A classifier is a function that maps an input attribute vector (e.g., $X=(X_1, X_2, X_3, X_4, X_n)$), to a confidence that the input belongs to a class (e.g., $f(x)$=confidence(suitability class)). In the case of suitability classification, attributes can be, for example, artifact's type, size, shape, composition, location on the specimen, reference design and/or any other suitable characteristic, to determine an artifact's suitability for super-resolution imaging.

A support vector machine (SVM) is an example of a classifier that can be employed. SVM operates by finding a hypersurface in the space of possible inputs that attempts to split the triggering criteria from the non-triggering events. This makes the classification correct for testing data that is near, but not identical to training data. Directed and undirected model classification approaches can be used and include, e.g., naïve Bayes, Bayesian networks, decision trees, and probabilistic classification models providing different patterns of independence can be employed. Classification as used herein is also inclusive of statistical regression that can be utilized to develop priority models.

The disclosed subject matter can employ classifiers that are trained via generic training data, extrinsic information (e.g., reference design, high resolution images of the same or similar type specimen (referred to herein as a ground truth high resolution image)), and/or feedback from super-resolution system 100, as super-resolution operation 300 progresses. For example, SVM's can be configured via a learning or training phase within a classifier constructor and feature selection module. Thus, the classifier(s) can be used to automatically perform a number of functions, including but not limited to the following: determining the context of an artifact (e.g., location of the artifact on a specimen, the type of specimen being inspected, similar artifacts on the same or similar type specimens, a reference design, a ground truth high resolution image), and analyzing the size, shape, composition of the artifact to better classify the artifact in order to correctly determine the suitability of the artifact for super-resolution imaging.

The SVM is a parameterized function whose functional form is defined before training. Specifically, a SVM is a function defined by one or more separating hyperplanes in a dimensional space of multiple or infinite dimensions. The SVM can be trained using an applicable method for training a supervised learning model. Training an SVM generally requires a labeled training set, since the SVM will fit the function from a set of examples. The training set can consist of a set of N examples. Each example consists of an input vector, xi, and a category label, yj, which describes whether the input vector is in a category. For each category there can be one or more parameters, e.g. N free parameters in an SVM trained with N examples, for training the SVM to form the separating hyperplanes. To train the SVM using these parameters, a quadratic programming (QP) problem can be solved as is well understood. Alternatively, sub-gradient descent and coordinate descent can be used to train the SVM using these parameters. These techniques may include a Sequential Minimal Optimization technique as well as other techniques for finding/solving or otherwise training the SVM classifier using such techniques.

Further, the disclosed subject matter can be implemented using unsupervised machine learning techniques. Specifically, confidence image determinations of super-resolution images can be identified using unsupervised learning techniques. Further, suitability of artifacts in low resolution images in being used to form a super-resolution image can be identified using unsupervised learning techniques. Unsupervised learning techniques include applicable methods for recognizing patterns in uncategorized/unlabeled data. For example, a neural network can be used to implement the disclosed subject matter through unsupervised learning techniques.

Figure 5:
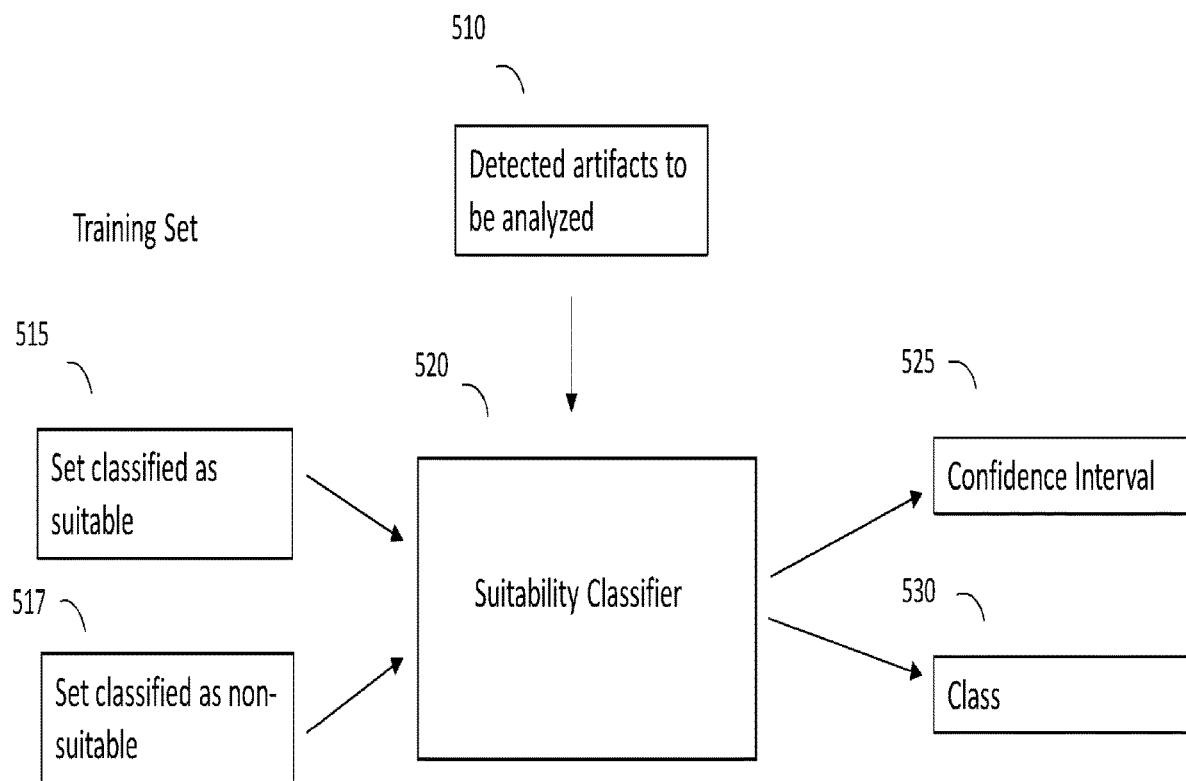
FIG. 5 depicts a scheme of training a suitability classifier for use in providing super-resolution image feedback control.

Referring to FIG. 5, the diagram illustrates a scheme, in accordance with some embodiments of the disclosed subject matter, wherein detected artifacts 510 are classified into two classes: suitable and not suitable for super-resolution imaging. This is just an example and a plurality of other training sets may be employed to provide greater or higher resolution distinctions of classes (e.g., the classes can represent different suitability grades A, B, C, D, E and F or suitability scores.). Suitability of an artifact can be a measure of a likelihood that the artifact can be used to produce all or a portion of an accurate super-resolution image, at 340. Specifically, suitability of an artifact can be a measure of likelihood that a super-resolution image generated, at least in part, from a low resolution image will pass as a high confidence super-resolution image, e.g. at 350. More specifically, suitability of an artifact can be a prediction of how closely a super-resolution image created from a low resolution image of the artifact will correspond to an actual high resolution image of the same or similar type of specimen/artifact. For example, if there is a 95% chance that a super-resolution image created from a low resolution image of an artifact will correspond greatly, e.g. 90% correlation, with an actual high resolution image of a related artifact, then the artifact can be identified as suitable for super-resolution imaging, e.g. have a high suitability grade of A.

The suitability classifier 520 can be trained by a group of known artifacts 515 that represent artifacts suitable for super-resolution imaging and a group of known artifacts 517 that represent artifacts not suitable for super-resolution imaging. In other embodiments, suitability classifier 520 can be trained by a group of known artifacts that represent different suitability grades. Artifacts 510 to be analyzed can be input into suitability classifier 520, which can output a class 530, which indicates the class that the detected artifact most likely falls into. Further classes (e.g., a grade) can also be added if desired. In some embodiments, suitability classifier 520 can also output a scalar number 525, e.g. a suitability score, that can measure the likelihood that an artifact being analyzed falls into the class suitable for super-resolution imaging, if so desired, or the class not suitable for super-resolution imaging, for example.

The various scoring techniques, described herein, can be implemented using linear regression modeling. For example, either or both artifact suitability scoring and super-resolution image scoring can be implemented using linear regression modeling. Linear regression modeling is a machine learning technique for modeling linear relationships between a dependent variable and one or more independent variables. A simple linear regression model utilizing a single scalar prediction can be used to perform the scoring described herein. Alternatively, a multiple linear regression model utilizing multiple predictors can be used to perform the scoring described herein.

The likelihood that an artifact falls into a particular class is also referred to as a confidence level (or a confidence interval). Confidence level generally refers to the specified probability of containing the parameter of the sample data on which it is based is the only information available about the value of the parameter. For example, if a 95% confidence level is selected then it would mean that if the same population is sampled on numerous occasions and confidence interval estimates are made on each occasion, the resulting intervals would bracket the true population parameter in approximately 95% of the cases. An example of confidence level estimation that can be adapted for use by super-resolution system 100 is described by G. Papadopoulos et al., "Confidence Estimation Methods for Neural Networks: A Practical Comparison," ESANN 2000 proceedings—European Symposium on Artificial Neural Networks Bruges (Belgium), 26-8 Apr. 2000 D-Facto public., ISBN 2-930307-00-5, pp. 75-80, which is hereby incorporated by reference herein in its entirety. The disclosed method is just an example and is not intended to be limiting.

In embodiments where artifact suitability analysis module 160 determines suitability in a non-binary manner (e.g., scoring an artifact by grade or by number), artifact suitability analysis module 160 can be configured to compare the determined suitability score with an acceptable suitability tolerance for super-resolution system 100, e.g. as defined by an operator, hardware/firmware/software constraints, industry guidelines, and/or any other suitable standard. For artifacts receiving suitability scores falling below the acceptable suitability tolerance for super-resolution system 100, artifact suitability analysis module 160 can indicate for the identified artifacts to be scanned using a higher resolution objective. For artifacts receiving suitability scores at or above the acceptable suitability tolerance for super-resolution system 100, artifact suitability analysis module 160 can indicate for super-resolution images to be generated for the detected artifacts.

The classifier can also be used to automatically adjust the acceptable suitability tolerance used for determining suitability of an artifact for super-resolution imaging. A feedback mechanism can provide data to the classifier that automatically impacts the acceptable suitability tolerance based on historical performance data and/or improvement of one or more underlying artificial intelligence algorithms used by super-resolution system 100. For example, an acceptable suitability tolerance can initially be set so that all detected artifacts receiving a letter grade of C and above, or a number grade of 50 and above, are deemed suitable for super-resolution imaging. If feedback from super-resolution analysis module 180 shows that a large number of artifacts determined to be suitable ultimately yielded low confidence super-resolution images, then the classifier can raise the acceptable suitability tolerance making it more difficult for artifacts to be classified as suitable. Conversely, if feedback from super-resolution module 170 shows that its model has improved and is better able to generate super-resolution images for defects previously classified as unsuitable, then the classifier can lower the acceptable suitability tolerance making it easier for artifacts to be classified as suitable.

The acceptable suitability tolerance used by artifact suitability analyzer module 160 to determine suitability can also be automatically adjusted based on the importance of a specimen and/or an area of a specimen being examined. For example, artifact suitability analyzer module 160 can adjust the acceptable suitability tolerance upwards for specimens and/or areas of a specimen considered important and/or adjust the acceptable suitability tolerance downwards for specimens and/or areas of a specimen not considered important.

Note that suitability analyzer module 160 is not restricted to employing artificial intelligence for determining suitability of an artifact for super-resolution imaging. In some embodiments, artifact suitability analyzer module 160 can be preprogrammed to recognize suitable and unsuitable artifacts. Based on the preprogrammed data, suitability analyzer module 160 can process one or more low resolution images to determine whether the low resolution images(s) include any artifacts similar to the preprogrammed artifacts and determine suitability based on the suitability of the preprogrammed artifacts.

In operation, in some embodiments, the artificial intelligence algorithms used by artifact suitability analysis module 160, can be based on comparing characteristics of and/or context data for the detected artifact to characteristics of and/or context data of training data to generate a suitability score. For example, if a detected artifact closely resembles an artifact from the training data that received a score of A, then artifact suitability analysis module 160 can assign a similar score to the detected artifact.

In further embodiments, the artificial intelligence algorithms used by artifact suitability analysis module 160, can be based on comparing characteristics of and/or context data for the detected artifact to characteristics of and/or context data of training data that yielded high confidence super-resolution images (e.g., as determined by super-resolution analysis module 180) to generate a suitability score. For example, artifact suitability analysis module 160 can assign a lower score to detected artifacts resembling training data that yielded low confidence super-resolution images and a higher score to detected artifacts resembling training data that yielded high confidence super-resolution images.

In another embodiment, the artificial intelligence algorithms used by artifact suitability analysis module 160, can be based on comparing detected artifacts on a specimen to artifacts in a high resolution image of the same or similar type specimen (also referred to as the ground truth high resolution image). If the detected artifact corresponds to two or more artifacts in the ground truth high resolution scan, and the context data for the detected artifact does not provide additional information, then artifact suitability analysis module 160 can assign a low suitability score. Conversely, if the detected artifact corresponds to only one artifact in the ground truth high resolution image, then artifact suitability analysis module 160 can assign a high suitability score to the detected artifact.

Artifact suitability analysis module 160 can also be configured, in some embodiments, to record the identified artifacts, their suitability scores and the acceptable suitability tolerance at which the analysis was performed.

In some embodiments, super-resolution module 170 can be configured to receive one or more low resolution images of a specimen that are determined to be suitable for super-resolution generation, and to generate one or more super-resolution image(s) from the received image(s). Alternatively, super-resolution module 170 can be configured to receive one or more low resolution images of a specimen irrespective of whether the low resolution images are deemed actually suitable for super-resolution generation, and to generate one or more super-resolution image(s) from the received images. In some embodiments, one or more artificial intelligence algorithm(s) can be used to generate one or more super-resolution images from one or more low resolution images. In some embodiments, the algorithms used by super-resolution module 170, can consider context date like location of the artifact on the specimen, the type of specimen being inspected, a comparison of the artifact to other artifacts detected on the same or similar specimens, a reference design, low resolution images taken at different focus levels and/or using different lighting techniques, high resolution images taken at different focus levels and/or using different lighting techniques, etc. In further embodiments, the algorithms used by super-resolution module 170, can include classifying an artifact, as well as identifying its size, shape, composition, location on the specimen and/or any other suitable characteristic to infer an accurate high resolution image.

Super-resolution methods employed by super-resolution module 170 can include, but are not limited to: interpolation, super-resolution from low resolution depth image frames, super-resolution through fusing depth image and high resolution color image, example-based super-resolution, and depth image super-resolution based on edge-guided method.

Some examples of interpolation that can be adapted for use by super-resolution module 170 are described by: Xie, J. et al., "Edge-guided Single Depth Image Super-resolution," IEEE Trans. Image Process. 2016, 25, 428-438; Prajapati, A. et al., "Evaluation of Different Image Interpolation Algorithms," Int. J. Comput. Appl. 2012, 58, 466-476; Pang, Z. et al, "An Improved Low-cost Adaptive Bilinear Image Interpolation Algorithm," In Proceedings of the 2nd International Conference on Green Communications and Networks, Chongqing, China, 14-16 Dec. 2012; Springer: Berlin/Heidelberg, Germany, 2013; pp. 691-699; Ning, L. et al., "An Interpolation Based on Cubic Interpolation Algorithm," In Proceedings of the International Conference Information Computing and Automation," Chengdu, China, 20-22 Dec. 2007; pp. 1542-1545, which are hereby incorporated by reference herein in their entirety. The disclosed methods are just examples and are not intended to be limiting.

Some examples of super-resolution from low resolution depth image frames that can be adapted for use by super-resolution module 170 are described by: Schuon, S. et al., "LidarBoost: Depth Superresolution for ToF 3D Shape Scanning," In Proceedings of the 2009 the 22nd International Conference on Computer Vision and Pattern Recognition, Miami, Fla., USA, 20-25 Jun. 2009; pp. 343-350; Rajagopalan, A. N. et al., "Resolution Enhancement of PMD Range Maps," In Proceedings of the Joint Pattern Recognition Symposium, Munich, Germany, 10-13 Jun. 2008; Springer: Berlin/Heidelberg, Germany, 2008; pp. 304-313; Al Ismaeil, K. et al., "Dynamic Super-resolution of Depth Sequences with Non-rigid Motions," In Proceedings of the 2013 20th IEEE International Conference on Image, Melbourne, Australia, 15-18 Sep. 2013; pp. 4; Gevrekci, M. et al., "Depth Map Super-resolution," In Proceedings of the 2011 18th IEEE International Conference on Image, Brussels, Belgium, 11-14 Sep. 2011; pp. 3449-3452, which are hereby incorporated by reference herein in their entirety. The disclosed methods are just examples and are not intended to be limiting.

Some examples of super-resolution through fusing depth image and high resolution color image, that can be adapted for use by super-resolution module 170 are described by: Ferstl, D. et al., "Image Guided Depth Upsampling Using Anisotropic Total Generalized Variation," In Proceedings of the IEEE International Conference on ComputernVision, Sydney, NSW, Australia, 1-8 Dec. 2013; pp. 993-1000; Yang, Q. et al., "Spatial-Depth Super-resolution for Range Images, In Proceedings of the 2007 IEEE Computer Society Conference on Computer Vision and Pattern Recognition, Minneapolis, Minn., USA, 17-22 Jun. 2007; pp. 1-8; Lo, K. H. et al., "Edge-Preserving Depth Map Upsampling by Joint Trilateral Filter," IEEE Trans. Cybern. 2017, 13, 1-14, which are hereby incorporated by reference herein in their entirety. The disclosed methods are just examples and are not intended to be limiting.

Some examples of example-based super-resolution that can be adapted for use by super-resolution module 170 are described by: Timofte, R. et al., "A+: Adjusted Anchored Neighborhood Regression for Fast Super-Resolution," In Proceedings of the Asian Conference on Computer Vision, Singapore, 1-5 Nov. 2014; Springer: Cham, Switzerland, 2014; pp. 111-126; Yang, J. et al., "Image Super-resolution via Sparse Representation," IEEE Trans. Image Process. 2010, 19, 2861-2873; Xie, J. et al., "Single Depth Image Super-resolution and Denoising via Coupled Dictionary Learning with Local Constraints and Shock Filtering," In Proceedings of the 2014 IEEE International Conference on Multimedia and Expo (ICME), Chengdu, China, 14-18 Jul. 2014; pp. 1-6; Kim, J. et al., "Accurate Image Super-resolution Using Very Deep Convolutional Networks," In Proceedings of the IEEE Conference on Computer Vision and Pattern Recognition, Las Vegas, Nev., USA, 27-30 Jun. 2016; pp. 1646-1654, which are hereby incorporated by reference herein in their entirety. The disclosed methods are just examples and are not intended to be limiting.

An example of depth image super-resolution based on edge-guided method that can be adapted for use by super-resolution module 170 is described by: Zhou, D. et al., "Depth Image Super-resolution Based on Edge-Guided Method," App. Sci. 2018, 8, 298, which is hereby incorporated by reference herein in its entirety. The disclosed method is just an example is not intended to be limiting.

In some embodiments, an artificial intelligence algorithm used by super-resolution module 170 can be trained using low resolution images only.

In some embodiments, super-resolution analysis module 180 can be configured to receive one or more super-resolution images from super-resolution module 170 and/or from any computer readable media, and determine an image class (or grade) for each super-resolution image of an artifact. In some embodiments, one or more artificial intelligence algorithm(s) can be used to determine an image class for super-resolution images of an artifact. In some embodiments, the image class can be a binary class (e.g., "high confidence super-resolution image" and "low confidence super-resolution image"). In other embodiments, the class can provide greater or higher resolution distinctions of classes (e.g., a letter grade A-F, where A denotes the best grade and where F denotes the worst grade, or a number grade 1-100, where 1 denotes the worst grade and 100 denotes the best grade).

In some embodiments, super-resolution analysis module 180 can apply a classification algorithm to determine an image grade for a super-resolution image. In some embodiments, the classification algorithm is first trained with training data to identify shared characteristics of super-resolution images of artifacts that are high confidence super-resolution images and those that are low confidence super-resolution images. In some embodiments, training data can include examples of super-resolution images for the types of artifacts/specimens that are being examined by super-resolution system 100 and their corresponding image scores/grades and/or cross correspondence to actual high resolution images of the same or similar type of specimen/artifact. In some embodiments, the classification algorithm can make inferences about an image class based on a reference design, a ground truth high resolution image of the same or similar specimen type, a ground truth high resolution image of the same or similar artifact type, an artifact's type, size, shape, composition, location on the specimen and/or any other suitable characteristic. In some embodiments, training data can also include explicit image class assignments based on a portion of a specimen that is being imaged, an artifact location (i.e., location of an artifact on a specimen), a reference design, a ground truth high resolution image, type of artifact and/or its size, shape and/or composition.

Once the classification algorithm is trained it can be applied by super-resolution analysis module 180 to determine an image class for an image of an artifact generated by super-resolution.

A support vector machine (SVM) is an example of a classifier that can be employed. Directed and undirected model classification approaches can also be used and include, e.g., naïve Bayes, Bayesian networks, decision trees, and probabilistic classification models providing different patterns of independence can be employed. Classification as used herein is also inclusive of statistical regression that can be utilized to develop priority models.

The disclosed subject matter can employ classifiers that are trained via generic training data, extrinsic information (e.g., reference design, ground truth high resolution image of the same or similar type specimen/artifact), and/or feedback from super-resolution system 100, as super-resolution operation 300 progresses. For example, SVM's can be configured via a learning or training phase within a classifier constructor and feature selection module. Thus, the classifier(s) can be used to automatically perform a number of functions, including but not limited to the following: determining context data for a super-resolution image (e.g., location of artifact on the specimen, the type of specimen being inspected, similar artifacts on similar specimens, a reference design, a ground truth high resolution image of the same or similar type specimen, a ground truth high resolution image of the same or similar type artifact) and analyzing the size, shape, composition of the artifact to better classify the artifact in order to correctly determine the image grade of a super-resolution image for an artifact.

Figure 6:
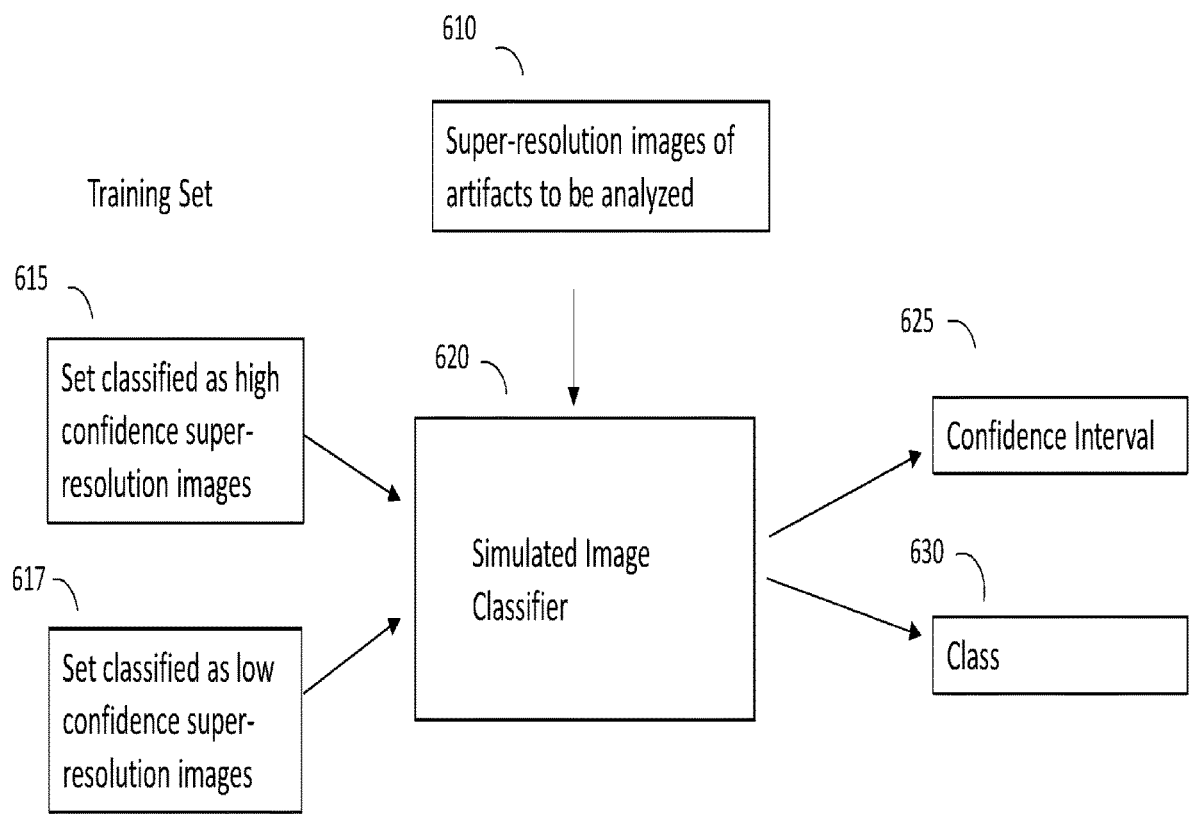
FIG. 6 depicts a scheme of training a simulated image classifier for use in providing super-resolution image feedback control.

Referring to FIG. 6, the diagram illustrates a scheme, in accordance with some embodiments of the disclosed subject matter, wherein super-resolution images of artifacts 610 are classified into two classes: low confidence super-resolution images and high confidence super-resolution images. This is just an example and a plurality of other training sets can be employed to provide greater or higher resolution distinctions of classes (e.g., the classes can represent different image grades A, B, C, D, E and F or image scores 1-100). The simulated image classifier 620 can be trained by a group of known super-resolution images 615 that are high confidence super-resolution images of artifacts and a group of known super-resolution images 617 that represent low confidence super-resolution images of artifacts. In other embodiments, simulated image classifier 620 can be trained by a group of known super-resolution images that represent different image grades. Super-resolution images of artifacts 610 to be analyzed can be input into simulated image classifier 620, which can output a confidence interval 625 that can measure the likelihood that the super-resolution image being analyzed falls into a particular class (e.g., high confidence super-resolution image and low confidence super-resolution image). In some embodiments, simulated image classifier 620 can also output a class 630, which indicates the class that the super-resolution image most likely falls into. Further classes (e.g., a lettered or numbered grade) can also be added if desired In embodiments where super-resolution analysis module 180 determines image classification in a non-binary manner (e.g., scoring a super-resolution image by grade or by number), super-resolution analysis module 180 can be configured to compare the determined image grade with an acceptable image tolerance for super-resolution system 100, as defined by an operator, hardware/firmware/software constraints, industry guidelines, and/or any other suitable standard. For super-resolution images receiving image scores falling below the acceptable image tolerance for super-resolution system 100, super-resolution analysis module 180 can indicate for the artifacts in the super-resolution images to be scanned using a higher resolution objective. Image tolerances and corresponding image scores assigned by the super-resolution analysis module 180 can indicate whether a super-resolution image is a high confidence super-resolution image or a low confidence super-resolution image. For example, super-resolution images having image scores at or above an acceptable image tolerance can be identified as high confidence super-resolution images. Conversely, super-resolution images having image scores below an acceptable image tolerance can be identified as low confidence super-resolution images. For super-resolution images receiving image scores at or above the acceptable image tolerance for super-resolution system 100, the super-resolution images can be provided to image assembly module 190.

The classifier can also be used to automatically adjust the acceptable image tolerance used for determining whether an artifact rendered by super-resolution passes or fails the tolerance. A feedback mechanism can provide data to the classifier that automatically impacts the tolerance based on historical performance data and/or improvement of one or more underlying artificial intelligence algorithms used by super-resolution system 100. For example, the classifier can adjust the tolerance based on feedback about super-resolution images correctly and/or incorrectly classified as high or low confidence super-resolution images. For example, if feedback from artifact comparison module 195 shows that a large number of super-resolution images had to be rescanned using a higher resolution objective, then the classifier can raise the acceptable image tolerance making it more difficult for super-resolution images to qualify. In some embodiments, if feedback from super-resolution module 170 shows that its model has improved and is better able to simulate high resolution images for super-resolution images previously classified as low confidence super-resolution images, then the classifier can lower the acceptable image tolerance making it easier for super-resolution images to qualify.

The image tolerance used by super-resolution analysis module 180 to determine an acceptable image tolerance can also be automatically adjusted based on the importance of a specimen and/or an area of a specimen being examined. For example, super-resolution analysis module 180 can adjust the acceptable image tolerance upwards for specimens and/or areas of a specimen considered important and/or adjust the acceptable image tolerance downwards for specimens and/or areas of a specimen not considered important.

Note that super-resolution analysis module 180 is not restricted to employing artificial intelligence for determining an image grade for super-resolution images. In some embodiments, super-resolution analysis module 180 can be preprogrammed to recognize super-resolution images of artifacts that have acceptable and non-acceptable image grades. Based on the preprogrammed data, super-resolution analysis module 180 can process one or more super-resolution image to determine whether the super-resolution images(s) include any images similar to the preprogrammed images and determine acceptable image grades based on the image grades of the preprogrammed super-resolution and/or high resolution images.

In operation, in some embodiments, the artificial intelligence algorithms used by super-resolution analysis module 180, can be based on comparing characteristics of and/or context data for the super-resolution image to characteristics of and/or context data of training data to generate an image score. For example, if a super-resolution image of an artifact closely resembles a super-resolution image of an artifact from the training data set that received an image score of A, then super-resolution analysis module 180 can assign a similar score to the super-resolution image.

In another embodiment, the artificial intelligence algorithms used by super-resolution analysis module 180, can be based on comparing super-resolution images of an artifact found on a specimen to a high resolution image of the same or similar type artifact or specimen. If the super-resolution analysis module 180 finds a close correspondence, then it can assign a high image score to the super-resolution image. Conversely, if super-resolution analysis module 180 finds a poor correspondence, then it can assign a low image score to the super-resolution image.

Super-resolution analysis module 180 can also be configured, in some embodiments, to record the received super-resolution images and their image grades, as well as the acceptable image tolerance at which the analysis was performed.

In some embodiments, image assembly module 190 can be configured to assemble and stitch together the super-resolution images, and the actual high resolution images into a single coherent image of a specimen. In some embodiments, each image of a specimen is referred to as a tile, wherein each tile can be located by its XY coordinate position in a specimen space. For artifacts that yielded a low confidence super-resolution image or determined to be unsuitable for super-resolution imaging, and therefore, designated for scanning by a high resolution objective, the high resolution objective can then scan the area on the specimen representing the tile or tiles that contain the identified artifacts. Similarly, super-resolution module 170 can simulate the entire tile or tiles that contain the artifacts determined to be suitable for super-resolution imaging. The high resolution images of the tiles and the super-resolution images of the tiles can be stitched together based on their XY coordinate positions and/or feature-based registration methods. This is just one example of how a single coherent image can be assembled, and other suitable methods for accomplishing this can be performed. In some embodiments, super-resolution module 170 can simulate the entire specimen (even portions of the specimen that were indicated unsuitable for super-resolution imaging) and image assembly module 190 can replace the unsuitable portions with high resolution images of those portions. Image assembly module 190 can use a high resolution image tile's XY location, as well as identify similar features between the high resolution image tile and the super-resolution image tile to determine where to place the high resolution image tiles. Once image assembly module 190 locates the correct position for the high resolution image tile, the super-resolution image tile can be replaced with the high resolution image tile. While the above method assumes no more than a single artifact per tile, the method can be adapted to accommodate multiple artifacts per tile.

In some embodiments, artifact comparison module 195 can be configured to receive a single coherent image of a specimen (e.g., from image assembly module 190 and/or any suitable computer readable media) and determine a total number of artifacts for the specimen. The artifact comparison module 195 can compare the total number with a tolerance that is typical for the type of specimen that was scanned, or based on a tolerance defined for super-resolution system 100, by an operator, hardware/firmware/software constraints, industry guidelines, and/or any other suitable standard. In some embodiments, if the total number of artifacts exceed or fall below the tolerance for the type of specimen that was scanned, and/or the defined tolerance for super-resolution system 100, then super-resolution analysis module 180, based on feedback from artifact comparison module 195, can select a second set of super-resolution images falling below a higher acceptable image tolerance to be rescanned using high resolution objective 132 or 135. Specifically, super-resolution analysis module 180 can select a set of super-resolution images as part of further controlling operation of super-resolution system 100 to generate one or more high resolution images for a specimen. For example, if the acceptable image tolerance for super-resolution analysis module 180 was initially set at 50%, and artifact comparison module 195 determines that the total number of artifacts detected for the specimen does not seem typical for the type of specimen examined, as explained above, then super-resolution analysis module 180 can raise the acceptable image tolerance to 60%, and the super-resolution images that were assigned an image grade between 50-59% will be rescanned using a high resolution objective. Feedback to super-resolution analysis module 180 and adjustment to the acceptable image tolerance can occur as many times as necessary.

In some embodiments, if the total number of artifacts exceed or fall below a tolerance for the type of specimen that was scanned, and/or the defined tolerance for super-resolution system 100, then artifact suitability analysis module 160 can select a second set of artifacts falling below a higher acceptable suitability tolerance to be rescanned using high resolution objective 135. Specifically, the artifact suitability analysis module 160 can select a set of second artifacts as part of further controlling operation of super-resolution system 100 to generate one or more high resolution images for a specimen. For example, if the acceptable suitability tolerance for artifact suitability analysis module 160 was initially set at 50%, and artifact comparison module 195 determines that the total number of artifacts detected for the specimen does not seem typical for the type of specimen examined, as explained above, then artifact suitability analysis module 160 can raise the suitability threshold to 60% and the artifacts that were assigned a suitability score between 50-59% will be rescanned using a high resolution objective. Feedback to artifact suitability analysis module 160 and adjustment to the acceptable suitability tolerance can occur as many times as necessary.

In some embodiments if the total number of artifacts exceed or fall below a tolerance for the type of specimen that was scanned and/or a tolerance defined for super-resolution system 100, then artifact comparison module 195 can determine that super-resolution module 170 is using an unsuitable artificial intelligence model to generate super-resolution images and instruct super-resolution module 170 to use a different artificial intelligence model to generate super-resolution images for a particular specimen. Specifically, the super-resolution module 170 can use different artificial intelligence models as part of further controlling operation of super-resolution system 100 to generate one or more high resolution images for a specimen.

Although the descriptions herein refer to analyzing artifacts, the mechanisms described here can also be used to analyze areas of a specimen. For example, instead of determining suitability based on analyzing artifacts, artifact suitability analysis module 160 can determine suitability based on analyzing distinct areas of a specimen. Similarly, instead of determining image grades based on analyzing artifacts generated using super-resolution, super-resolution analysis module 180 can determine image grades based on analyzing distinct areas of a specimen rendered using super-resolution.

The functionality of the components for super-resolution system 100 can be combined into a single component or spread across several components. In some embodiments, the functionality of some of the components (e.g., high resolution scanning by high resolution objective 132 or 135 and computer processing by computer system 150) can be performed remotely from microscopy inspection system 110.

Note that super-resolution system 100 can include other suitable components not shown. Additionally or alternatively, some of the components included in super-resolution system 100 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable mediums described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The super-resolution feedback control mechanism, method and system have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure. The scope of the invention is limited only by the claims that follow.

The invention claimed is:

1. A method comprising:
obtaining, by a computing system, a training data set comprising a plurality of high confidence super-resolution images and a plurality of low confidence super-resolution images;
generating, by the computing system, a simulated image classifier for determining a confidence interval that measures a likelihood of a super-resolution image falls into a particular class by:
inputting the training data set into a machine learning algorithm; and
learning, via the machine learning algorithm, to classify super-resolution images of artifacts;
obtaining, by the computing system, a target super-resolution image of a specimen;
analyzing, by the computing system via the simulated image classifier, the target super-resolution image to determine a class associated with the target super-resolution image; and
determining, by the computing system via the simulated image classifier, the class of the target super-resolution image and a confidence interval of the class.

2. The method of claim 1, wherein obtaining, by the computing system, the training data set comprising the plurality of high confidence super-resolution images and the plurality of low confidence super-resolution images comprises:
obtaining a set of high confidence super-resolution images, wherein each high confidence super-resolution image in the set of high confidence super-resolution images comprises an image grade or image score associated therewith.

3. The method of claim 1, wherein determining, by the computing system via the simulated image classifier, the class of the target super-resolution image and the confidence interval of the class comprises:
comparing, by the computing system via the simulated image classifier, the target super-resolution image with an acceptable image tolerance.

4. The method of claim 3, further comprising:
responsive to determining that the target super-resolution image falls below the acceptable image tolerance, indicating that artifacts in the super-resolution image is to be scanned using a higher resolution objective.

5. The method of claim 3, further comprising:
responsive to determining that the target super-resolution image meets or exceeds the acceptable image tolerance, providing the target super-resolution image to an image assembly module.

6. The method of claim 3, further comprising:
utilizing a feedback mechanism to dynamically adjust the acceptable image tolerance based on an accuracy of the simulated image classifier.

7. The method of claim 3, further comprising:
dynamically adjusting, by the computing system, the acceptable image tolerance based on an importance of the specimen.

8. A non-transitory computer readable medium having one or more sequences of instructions, which, when executed by one or more processors, causes a computing system to perform operations, comprising:
obtaining, by the computing system, a training data set comprising a plurality of high confidence super-resolution images and a plurality of low confidence super-resolution images;
generating, by the computing system, a simulated image classifier for determining a confidence interval that measures a likelihood of a super-resolution image falls into a particular class by:
inputting the training data set into a machine learning algorithm; and
learning, via the machine learning algorithm, to classify super-resolution images of artifacts;
obtaining, by the computing system, a target super-resolution image of a specimen;
analyzing, by the computing system via the simulated image classifier, the target super-resolution image to determine a class associated with the target super-resolution image; and
determining, by the computing system via the simulated image classifier, the class of the target super-resolution image and a confidence interval of the class.

9. The non-transitory computer readable medium of claim 8, wherein obtaining, by the computing system, the training data set comprising the plurality of high confidence super-resolution images and the plurality of low confidence super-resolution images comprises:
obtaining a set of high confidence super-resolution images, wherein each high confidence super-resolution image in the set of high confidence super-resolution images comprises an image grade or image score associated therewith.

10. The non-transitory computer readable medium of claim 8, wherein determining, by the computing system via the simulated image classifier, that the class of the target super-resolution image and the confidence interval of the class comprises:
comparing, by the computing system via the simulated image classifier, the target super-resolution image with an acceptable image tolerance.

11. The non-transitory computer readable medium of claim 10, further comprising:
responsive to determining that the target super-resolution image falls below the acceptable image tolerance, indicating that artifacts in the super-resolution image is to be scanned using a higher resolution objective.

12. The non-transitory computer readable medium of claim 10, further comprising:
responsive to determining that the target super-resolution image meets or exceeds the acceptable image tolerance, providing the target super-resolution image to an image assembly module.

13. The non-transitory computer readable medium of claim 10, further comprising:

utilizing a feedback mechanism to dynamically adjust the acceptable image tolerance based on an accuracy of the simulated image classifier.

14. The non-transitory computer readable medium of claim 10, further comprising:
dynamically adjusting, by the computing system, the acceptable image tolerance based on an importance of the specimen.

15. A system comprising:
one or more processors; and
a memory having programming instructions stored thereon, which, when executed by the one or more processors, causes the system to perform one or more operations, comprising:
obtaining a training data set comprising a plurality of high confidence super-resolution images and a plurality of low confidence super-resolution images;
generating a simulated image classifier for determining a confidence interval that measures a likelihood of a super-resolution image falls into a particular class by:
inputting the training data set into a machine learning algorithm; and
learning, via the machine learning algorithm, to classify super-resolution images of artifacts;
obtaining a target super-resolution image of a specimen;
analyzing, via the simulated image classifier, the target super-resolution image to determine a class associated with the target super-resolution image; and
determining, via the simulated image classifier, the class of the target super-resolution image and a confidence interval of the class.

16. The system of claim 15, wherein obtaining the training data set comprising the plurality of high confidence super-resolution images and the plurality of low confidence super-resolution images comprises:
obtaining a set of high confidence super-resolution images, wherein each high confidence super-resolution image in the set of high confidence super-resolution images comprises an image grade or image score associated therewith.

17. The system of claim 15, wherein determining, via the simulated image classifier, the class of the target super-resolution image and the confidence interval of the class comprises:
comparing, via the simulated image classifier, the target super-resolution image with an acceptable image tolerance.

18. The system of claim 17, further comprising:
responsive to determining that the target super-resolution image falls below the acceptable image tolerance, indicating that artifacts in the super-resolution image is to be scanned using a higher resolution objective.

19. The system of claim 17, further comprising:
responsive to determining that the target super-resolution image meets or exceeds the acceptable image tolerance, providing the target super-resolution image to an image assembly module.

20. The system of claim 17, further comprising:
utilizing a feedback mechanism to dynamically adjust the acceptable image tolerance based on an accuracy of the simulated image classifier.

* * * * *